United States Patent [19]

Hounshell

[11] Patent Number: 4,763,707
[45] Date of Patent: Aug. 16, 1988

[54] SELF-CENTERING ROUTER MORTISE BASE

[76] Inventor: Kenneth L. Hounshell, 6950 Eric La., Wheatland, Calif. 95962

[21] Appl. No.: 110,518

[22] Filed: Oct. 20, 1987

[51] Int. Cl.$^4$ ............................................. B27C 5/10
[52] U.S. Cl. ............................... 144/136 C; 33/32.2; 33/201; 144/134 D; 144/83
[58] Field of Search .......................... 33/32.2, 42, 191; 144/134 R, 134 D, 136 R, 136 C, 137, 82, 83

[56] References Cited

U.S. PATENT DOCUMENTS 4,294,297  10/1981  Kieffer ........................... 144/134 D Primary Examiner—W. Donald Bray

[57] ABSTRACT

An automatic self-centering cutting guide base plate for electric routers which can be utilized as either the main base plate or as an auxiliary sole plate and is adjustable for variable work surface heights and widths.

3 Claims, 2 Drawing Sheets

SELF-CENTERING ROUTER MORTISE BASE

BACKGROUND OF THE INVENTION

1. Field of the Invention

This invention relates to devices useful for centering the cutting bit of an electric router regardless of the thickness of the material used. The present invention is particularly directed towards a centering fixture with height adjustable removable aligners which can be manufactured as the main base plate of an electric router or supplied as an auxiliary fasten-on base plate.

2. Description of the Prior Art

Electrically powered hand-held routers having a downwardly positioned cutting bit for cutting a grove in a wood surface edge are in common use in both woodworking shops and home hobby shops. A method of centering the cutting bit in relationship to the edge of the piece being grooved has been somewhat of a complicated procedure. Devices seen in past-art patents do not seem to adequately accomplish a simple alignment procedure and require a certain degree of expertise in the field to utilize the device.

Patents examined which appeared most pertinent were the following:

A patent issued to W. L. Mitchell on Feb. 7, 1961, U.S. Pat. No. 2,970,618 illustrates a "Guide Means for Hand Routers" which uses a tab along the edge of the piece being worked.

The patent issued to Groves on Apr. 15, 1980, U.S. Pat. No. 4,197,887, shows a router guide with adjustable guide posts which when very carefully spaced are adapted to engage the edge of the workpiece.

The electric drill attachment of Elsbrenner, U.S. Pat. No. 3,288,183, dated Nov. 29, 1966, and the Willis router of U.S. Pat. No. 3,289,718, data issued Dec. 6, 1966, both are illustrative of edge-mounted plates as centering guides.

The Fortune patent issued June 17, 1969, U.S. Pat. No. 3,450,001; the Zelik device, U.S. Pat. No. 3,478,788, dated Nov. 18, 1969; the Bailey router guide U.S. Pat. No. 3,509,923, dated May 5, 1970; and the multijob router guide kit in U.S. Pat. No. 3,635,268, dated Jan. 18, 1972, issued to Lange, are illustrative of various mechanical attachments offered as router guides.

Considered most pertinent to my invention is the Groves device of U.S. Pat. No. 4,197,887, issued Apr. 15, 1980. The radially adjustable guide posts shown in the patent are not readily accessible for adjustment once the plate is attached to the router. This type of radial adjustment can become loosened during use and can cause the router blade to vary from a centered position. My router base guide eliminates any need for radial adjustment by positioning the guides posts in extensions past the outer circumference of the plate surface in a diametric alignment. To center the router blade using my router guide on any width board, it is only necessary to turn the router until the guide posts contact the edges of the board. As is described in the following specification, the guide posts in my router guide are adjustable vertically and removable without detaching the guide plate from the router.

To my knowledge, the foregoing patents represented devices most pertinent to my invention. Although router alignment devices may necessarily be somewhat similar, my invention comprises a substantial improvement over those previously mentioned by not requiring manual adjustments to enable the device to be used for centering and by having guide post depth adjustments.

SUMMARY OF THE INVENTION

In utilizing my invention, I have developed a mountable automatic self-centering base plate attachment for an electric router. My invention includes the necessary attachable components for the base plate which can be manufactured for use as the main base plate for the electric router or used as an auxiliary center guide attachment.

Therefore, it is a primary objective of my invention to provide an automatic centering means for use with any commercially available electric routing tool.

Another objective of the invention is to provide a device with height adjustable guide posts which therefore can be adaptable to work surfaces which are comprised of a variable of heights.

A further object of my invention is to provide a device which is easy to apply and use without requiring a high degree of expertise in the field of woodworking.

A still further object is to provide a router centering guide which can be sold at a reasonable price and which can also be manufactured at a reasonable price.

Other objects of the invention will prove obvious with a reading of the numbered parts described in the specification and a comparison there of with similarly numbered parts shown in the accompanying drawings.

DESCRIPTION OF THE PREFERRED EMBODIMENT

Figure 1:
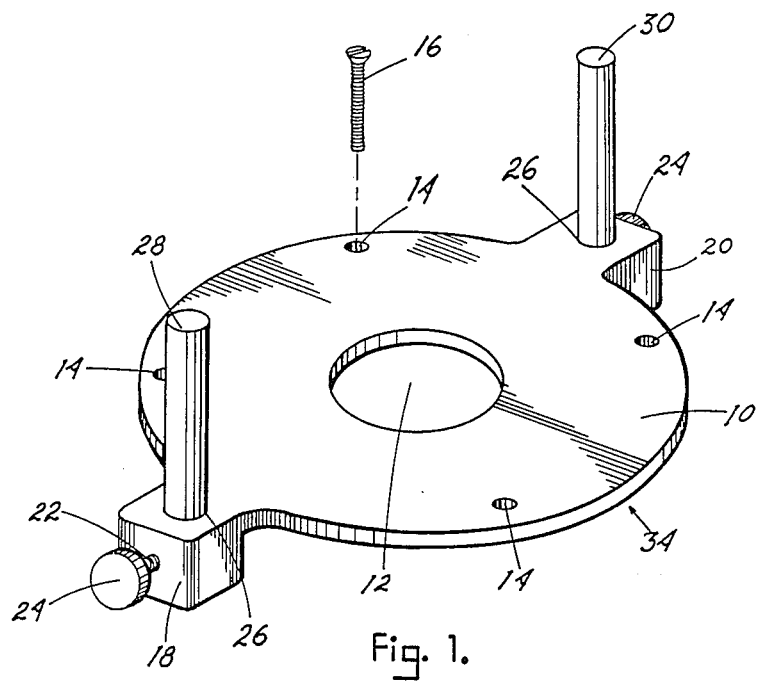
FIG. 1 shows a perspective view of the bottom working surface of the preferred embodiment of the invention with the two adjustable guide posts attached to two adjacent sides.
Figure 2:
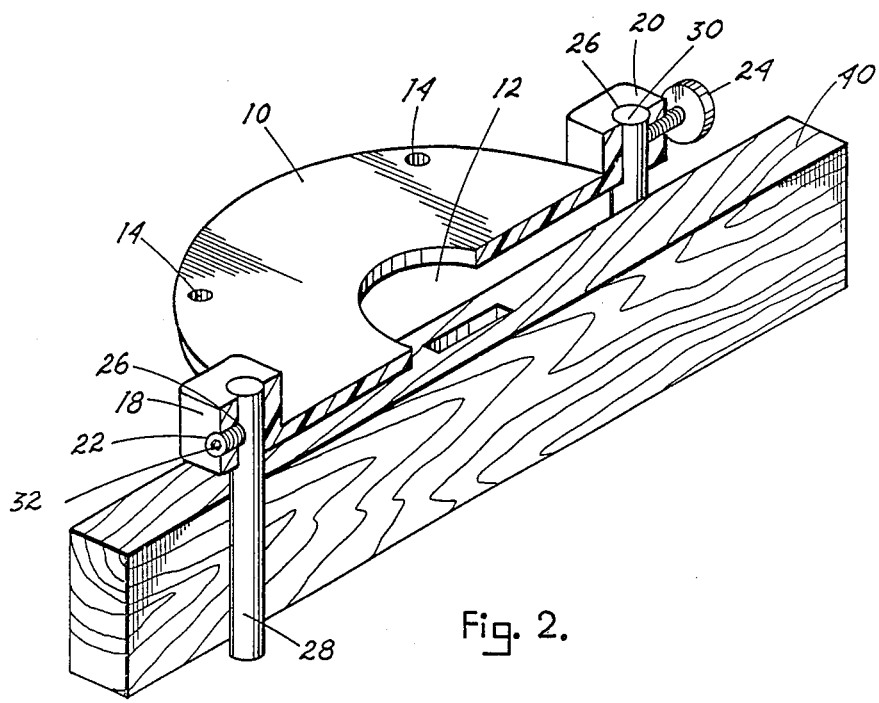
FIG. 2 shows a perspective cross-sectional view of the router mortise base centered over a work surface depicting an allen-screw style attachment means for the left adjustable guide post and a knob screw attachment means for the right adjustable guide post.
Figure 4:
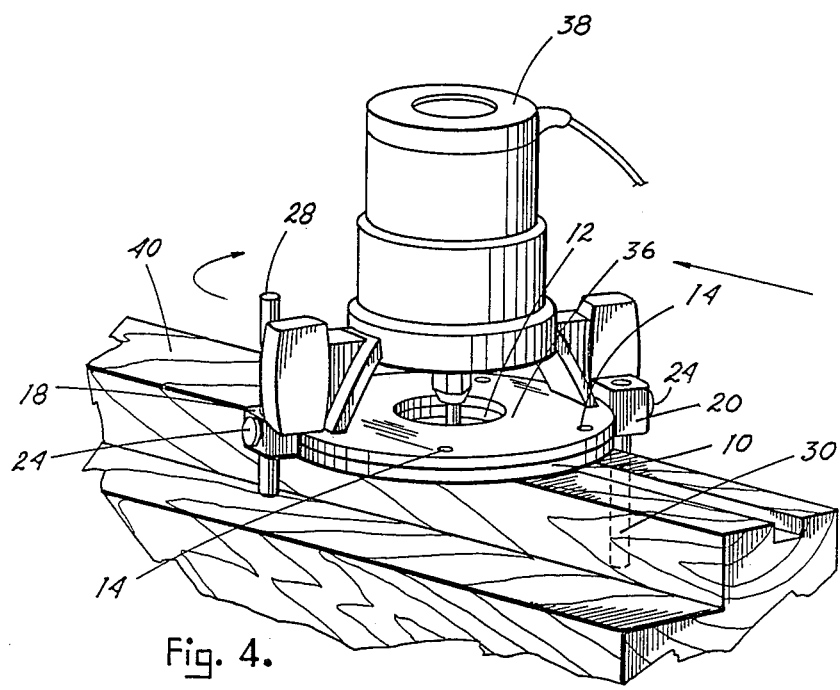
FIG. 4 shows a perspective view of the preferred embodiment of the invention mounted on a conventional electric router and depicting the adaptability of the router mortise base to variable heights in work surfaces.

In FIG. 1, a perspective view of the bottom working surface or the underside of the preferred embodiment is shown. The base plate 10 is depicted with a central aperture 12 and four mounting bolt apertures 14 for attachment with four mounting bolts 16 which are designed to correlate with standard bore openings of conventional electric routers, which are not shown. Two guide post flanges 18 and 20 are axially aligned to the outer edge of base plate 10 and contain one threaded horizontal bore 22 which does not extend through the guide post flange 18 or 20 and which houses a knob screw 24. Each guide post flange 18 and 20 also contain one vertical bore 26 which extends through flange 18 and 20 and connects to the end of threaded horizontal bore 22. Each vertical bore 26 movably houses an adjustable guide post 28 or 30 as seen in FIG. 2, and is secured in position by knob screw 24, which is pictured in FIG. 1 and FIG. 2 on the right adjustable guide post 30. A second method of securing adjustable guide posts 28 and 30 is shown in the form of an allen screw 32, which is used in conjunction with an allen wrench, not shown. Attachment of the assembled router mortise base 34, as seen in FIG. 4, is made to an electric router base plate 36 by mounting bolts 16 through mounting bolt apertures 14. In use, the electric router 38 with attached assembled router mortise base 34 is centered over the wooden work surface 40, as shown in FIG. 4, and a clockwise rotation is made in order for the adjustable guide posts 28 and 30 to come into contact with the edges of the wooden work surface 40. The edges of wooden work surface 40 then serve as parallel guides for the adjustable guide posts 28 and 30. Adjustments can be made to adjustable guide posts 28 and 30 for variations in the level of wooden work surface 40, also shown in FIG. 4. Constant clockwise rotational pressure must be exerted during the procedure in order to assure an even parallel groove. Counter clockwise rotation can also be effectively used to accomplish the same procedure.

Figure 3:
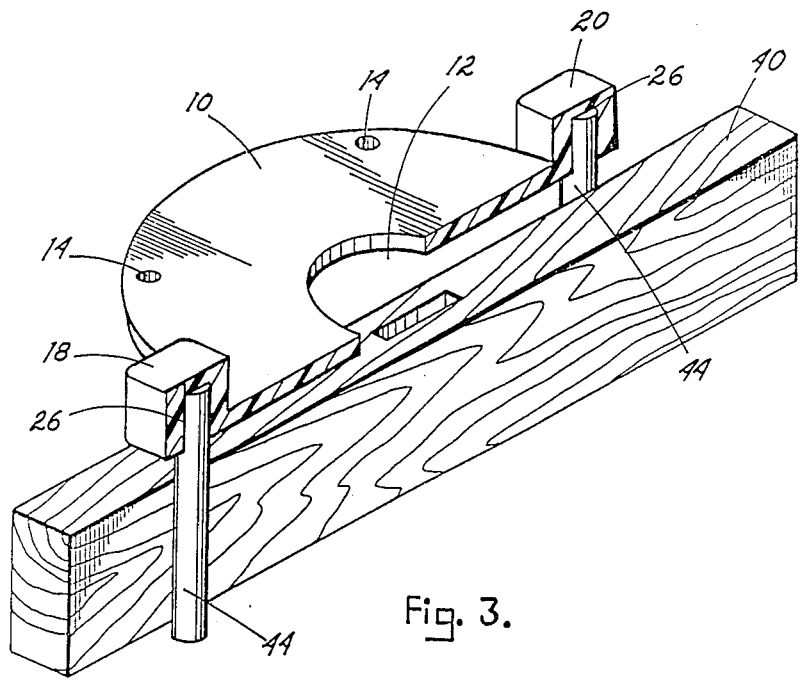
FIG. 3 shows a perspective cross-sectional view of the second embodiment of the invention centered over a work surface depicting the permanent guide post attachment.

A second embodiment 42 of the invention, as seen in FIG. 3, is comprised of permanent guide posts 44 which is permanently fixed to guide post flanges 18 and 20, and is designed for use as a centering guide for cutting central parallel grooves where adjustments in height of work surfaces are not required.

Although I have described my invention in length and in detail in the specification, it is to be understood that modifications may be practiced in the device which do not exceed the intended coverage of the appended claims.

I claim:

1. An automatic self-centering cutting guide assembly base for electric routers, comprising:
   a base plate having a centrally located aperture for passage of a cutting bit;
   a pair of rectangular guide post flanges attached radially to said base plate, each containing a smooth vertical bore and a threaded horizontal bore;
   mounting means for temporarily attaching said base plate to the working surface of an electric router with said cutting bit extending through said central aperture, and;
   a pair of substantially cylindrical guide posts vertically adjustable within said guide post flanges through said smooth vertical bores and being retainably engaged therein by manually turned screws acting as adjustable retaining means utilizing said threaded horizontal bores and having internal communication through said smooth vertical bores to said guide posts; said guide posts being of sufficient length to have adjustable retention above and below either end of said smooth vertical bores.

2. The device of claim 1 wherein said base plate is removably attached to said router base.

3. The device of claim 1 wherein said guide post flanges are axially connected to an outer edge of said base plate opposite to one another, having the bottom surface of said guide post flanges flush with the working surface of said base plate.

* * * * *